United States Patent [19]
Weaver et al.

[11] 3,946,116
[45] Mar. 23, 1976

[54] PREFORMED POTATO PRODUCTS

[75] Inventors: Merle L. Weaver, Martinez; Earl Hautala, Richmond; Masahide Nonaka, Moraga, all of Calif.

[73] Assignee: The United States of America as represented by the Secretary of Agriculture, Washington, D.C.

[22] Filed: Sept. 13, 1972

[21] Appl. No.: 288,803

Related U.S. Application Data

[62] Division of Ser. No. 136,926, April 23, 1971, Pat. No. 3,812,274.

[52] U.S. Cl. .............. 426/103; 426/104; 426/637
[51] Int. Cl.² ...................................... A23L 1/216
[58] Field of Search .................... 99/100, 207; 426/438–441, 637, 89, 103, 104

[56] References Cited
UNITED STATES PATENTS

| | | | |
|---|---|---|---|
| 1,327,254 | 1/1920 | Remmers | 99/100 P |
| 3,282,704 | 11/1966 | Fritzberg | 99/100 P |
| 3,297,450 | 1/1967 | Loska | 99/207 |
| 3,451,822 | 6/1969 | Fost | 99/100 P |
| 3,519,432 | 7/1970 | Succo | 99/100 P |
| 3,634,105 | 1/1972 | Beck | 99/207 |

*Primary Examiner*—Norman Yudkoff
*Assistant Examiner*—Martin G. Mullen
*Attorney, Agent, or Firm*—M. Howard Silverstein; William Takacs

[57] ABSTRACT

Potatoes are converted into convenience food products, using techniques which provide advantages over customary operations. Example: Potatoes are cooked and mashed. The mash is shaped into strips which are then treated with hot air to case-harden their surfaces. The resulting intermediates may be fried directly or held in frozen or cold storage for future use. On frying, they yield products which have the taste, appearance, color, and texture of high-quality conventional French fries plus added advantages of higher solids content, lower fat content, and no tendency to get limp.

3 Claims, 2 Drawing Figures

PREFORMED POTATO PRODUCTS

A non-exclusive, irrevocable, royalty-free license in the invention herein described, throughout the world for all purposes of the U.S. Government, with the power to grant sublicenses for such purposes, is hereby granted to the Government of the United States of America.

This is a division of our copending application Ser. No. 136,926, filed Apr. 23, 1971, now U.S. Pat. No. 3,812,274.

This invention relates to and has among its objects the provision of novel food products prepared from potatoes, and novel processes for making them. Further objects of the invention will be evident from the following description wherein parts and percentages are by weight unless otherwise specified. The terms "fat" and "oil" are used synonymously herein as designating an edible glyceride whether normally solid or liquid.

Much of the potato crop produced in the United States is utilized for the production of fried products such as French-fried potatoes, potato chips, shoe-string potatoes, etc.

The commercial production of a typical product—French-fried potatoes—is generally carried out as follows: Potatoes are washed, peeled, and cut into strips. The potato strips are then washed with cold water to remove surface starch, leached in hot (about 150°–180° F.) water to remove reducing sugars, drained, and then fried in edible oil. The fried products may be utilized directly, or frozen for future use. When the products are to be consumed, the frozen strips are heated in the oven, or given a short (finish) fry in hot edible oil.

Although the production of fried potato products is a relatively simple process, various problems confront the manufacturer. These problems are outlined as follows:

The necessity for peeling the potatoes involves substantial losses of valuable potato flesh. In the usual peeling operations, the losses average about 15–25% of the raw stock. Also, the peeling of potatoes requires the installation of complex equipment and procedures, and the use of corrosive chemicals such as caustic soda. Another factor is that conventional peeling systems yield enormous volumes of water containing organic matter, the disposal of which is a serious problem from a pollutional standpoint.

The cutting operation invariably yields a substantial proportion of irregular and/or undersized pieces. Such sub-standard pieces cannot be processed in the regular way and must be diverted into other channels which do not provide a full return.

The conventional step of washing the strips results in the release of both soluble and insoluble components from the cut cells into the wash water. Thus, there is a net loss of valuable potato material. Additionally, the wash-water presents a disposal problem because of its content of organic matter. The conventional step of leaching the strips with hot water entails similar problems of loss of nutrients and disposal of the waste water.

Another problem is the difficulty of producing products of acceptable and uniform color. This problem is brought about by variation in the chemical composition of the raw potatoes, and is explained as follows:

If the potatoes are freshly harvested or have been stored after harvest at a temperature of about 50° F. or above, no complications will generally occur. Under such circumstances, the raw pieces can be readily fried to yield a product of acceptable color. However, when the potatoes have been kept at the lower temperatures (that is, cold storage temperatures of about 40° F.) necessary for holding the tubers longer than about three months, complications set in. Potatoes held under such cold storage conditions tend to darken on frying to give products of very undesirable dark brown color, that is, products which are not marketable.

The reason why such potatoes tend to darken excessively can be explained as follows: When the potatoes are kept in cold storage, part of the starch in the tubers is converted into glucose or other reducing sugars. Thus it has been shown, for example, that the browning tendency of the tubers increases as the content of reducing sugars increases. It has also been postulated that the reducing sugars react with the nitrogenous constituents in the potatoes, whereby to produce dark-colored reaction products. During the frying operation this browning reaction proceeds very rapidly at the high temperature to which the potatoes are subjected. It is to be emphasized, however, that regardless of the theory involved, it is well established that potatoes which have been kept in cold storage brown excessively on frying, as discussed above.

A known method for remedying the situation outlined above involves "reconditioning" the potatoes which had been kept in cold storage. This reconditioning involves holding the potatoes at a temperature of about 70° F. for a period of about 1 to 3 weeks. The basis for the treatment is that during the holding period at the stated temperature, the content of reducing sugars is progressively decreased.

Although reconditioning is used in industry, it gives rise to its own problems and disadvantages. One item is that it is expensive as it involves extra handling costs, tying up of large quantities of potatoes, and added storage space and facilities for carrying out the treatment. Also, losses are involved, e.g., loss of solids due to respiration (conversion of carbohydrates into $CO_2$), loss of water due to evaporation, and losses due to sprouting and spoilage by microorganisms and/or insects or other pests. Another item is that some varieties (White Rose and Red LaSoda, for example) do not respond to reconditioning; hence, if such potatoes have been subjected to cold storage they cannot be used at all.

Even with reconditioning or when reconditioning is not used, it is necessary in the conventional procedure to remove the remaining surface sugars by leaching with hot water. Leaching is usually done at temperatures of 140° F. or above for times ranging from 10 to 20 minutes and often followed by a 2.5 to 3.5-minute immersion in water at 180°–190° F. to set the texture. Such drastic water treatments often remove all flavor, in addition to their undesired effects of extracting nutrients and giving rise to waste water disposal problems.

Another problem is conventional operations involves the matter of texture of the final product. Most restaurants, including the large franchise chains, prefer to prepare their French-fried potatoes from the frozen pre-fried product rather than to go through the cumbersome procedure of preparing French fries from raw potatoes. Although frozen pre-fried products offer convenience and savings in labor costs, one problem which has beset the industry is that when the products are prepared for the table (either by oven heating or by deep-fat frying), they are unstable as to texture. Immediately after removal from the oven or deep-fat fryer, the potato strips have a desirable crisp texture, but as they cool they become limp and soggy. This problem is particularly acute in large restaurant operations: Guests who receive the first portions of each batch enjoy French fries of desirable crisp texture, whereas others who receive subsequent portions of the batches can only contemplate with dismay the soggy, limp strips on their plates.

Another problem to be considered is that conventional fried products have a high proportion of fat (derived from that used in the frying operation) and many consumers would prefer to have a product with a lower fat content. In conventional operations the fat content of the product is not subject to control to any substantial degree.

Conventional production of French fries requires the use of large, uniformly-sized tubers so that strips of standard length may be cut therefrom. Potatoes of such grade command premium prices.

It is also to be realized that the flesh of any given tuber is not uniform—it varies in different parts. For example, the bud-end tissue is usually lower in solids content than the stem-end. Thus, the strips cut from the tubers will have varying composition along their length. This, in turn, gives rise to such problems as non-uniformity in color and texture in the fried product.

The primary object of the invention are to provide the means for obviating the problems outlined above. Basically, the objects of the invention are attained by applying the following operations:

1. Raw potatoes are cooked and mashed. A feature of the invention is that the cooking may be applied to unpeeled potatoes, whereby the peels become loosened during the cooking operation and can be readily separated as an incident to mashing. In this way, the usual cumbersome peeling steps—requiring the application of lye or other corrosive substances—are completely eliminated. Moreover, by first applying cooking and then removing the peels, the procedure is not only simplified but losses of potato material are reduced. For example, with our system, peeling losses are generally about 3.5 to 8% of fresh weight in contrast to losses of about 15–25% in conventional peeling operations.

2. The potato mash is shaped, for example by extrusion, into strips or other desired forms. This technique completely eliminates the raw material losses and waste disposal problems which invariably accompany the usual procedure of cutting the tubers into pieces. In the process of the invention, substantially all the potato flesh is utilized. Moreover, since we form our pieces from potato mash rather than by cutting from the whole tubers, it is not necessary for us to start with large tubers—we can use potatoes of any size, including unsized stock, and over- or under-sized stock. Also, the problems of non-uniformity within individual tubers is eliminated by our technique.

3. The shaped pieces of potato mash are treated—as by applying a hot-air or hot air plus steam treatment—in order to form a thin crust or case-hardened layer on the surfaces of the pieces. This crust improves the mechanical properties of the pieces. It renders them capable of further handling without danger of breakage, and it also ensures that the final product will have a desirable crisp exterior. It also protects the interior portions so that these portions retain their desirable mealy texture. In sum, the formation of a crust or case-hardened layer is a critical part of the invention as it ensures that the final product will have the desirable qualities of a good quality conventional fried product, namely, a crisp exterior and a mealy interior.

4. Following the formation of the above-described intermediate (the shaped pieces of mash enveloped in a case-hardened shell of potato tissue), various procedures may be used to advantage. A typical one is to fry the pieces and freeze them for future use. For ultimate consumption the frozen product merely needs to be heated in an oven to make it table-ready. A feature is that fried products produced in accordance with the invention do not become limp as they cool; they retain their rigidity even when they cool to room temperature.

Hereinabove, we have explained that in conventional procedures there are difficulties in achieving products of acceptable color. This is no problem with the process of the invention. We have observed that fried products of completely acceptable color are produced even when the raw stock is potatoes which have been held in cold storage and which by conventional operations would yield unacceptable dark products.

We have also explained above that in conventional procedures, the strips or other pieces cut from the tubers are washed to remove surface starch and leached in hot water. No comparable treatments are applied in the process of the invention. As a result we not only avoid losing nutrients by any leaching effect but we avoid the disposal problems encountered in the usual systems which employ the water-contacting steps in question.

Another advantage of the invention is that it yields products which have a higher solids content, i.e., more nutritive value, then conventional products. Moreover, fried products in accordance with the invention contain a lesser proportion of fat than conventional products.

In many conventional procedures, particularly where the products are sold in an intermediate stage for future frying or the like, it is necessary to incorporate preservatives such as sulphites to maintain color during storage. A feature of the invention is that no binders, preservatives, or other additives are required.

Figure 1:
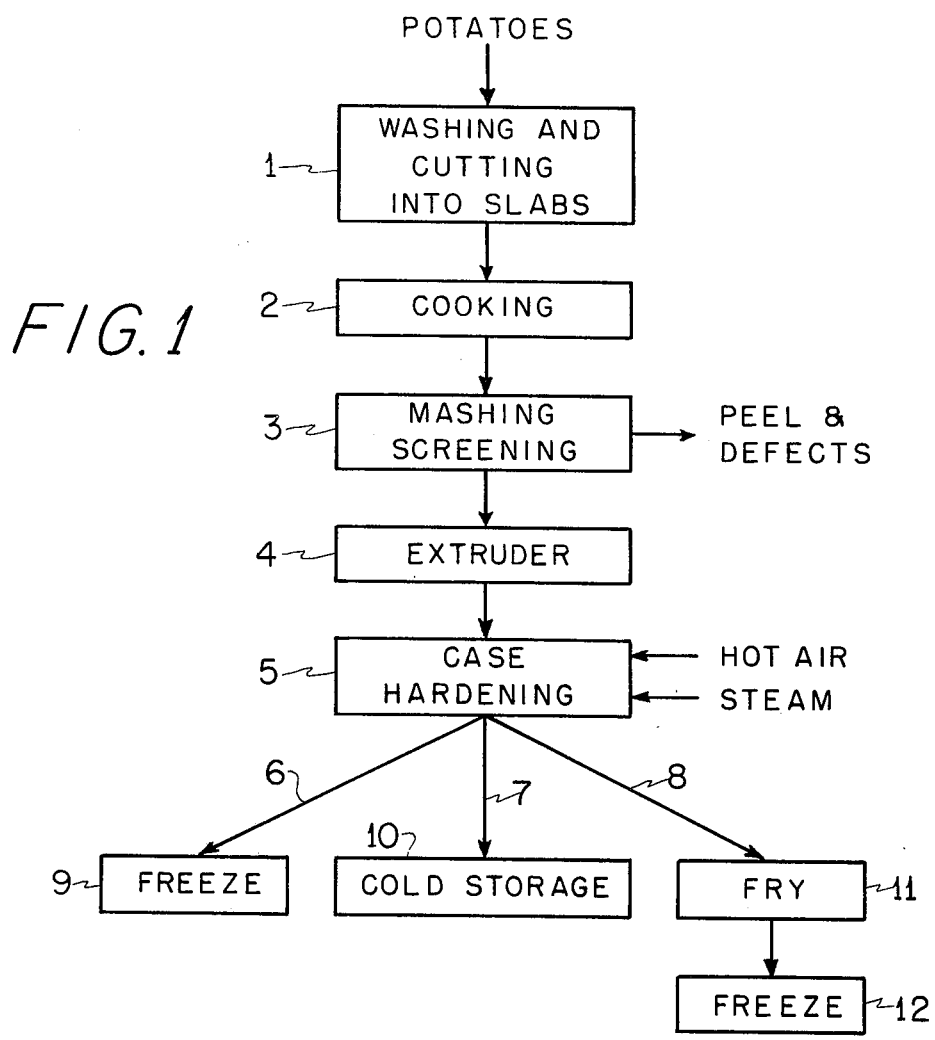
FIG. 1 is a flow sheet illustrating the procedures of the invention.

The practice of the invention is next described in detail, having reference to FIG. 1 of the annexed drawing.

Block 1 represents the application of preliminary steps, namely, washing of the raw potatoes and cutting them into slabs—for example, ones about 1 inch thick—to facilitate cooking.

The slabs of raw unpeeled potato are then fed into a cooker, block 2, which may take the form of conventional cooking apparatus operating at atmospheric or superatmospheric pressure wherein the potatoes are cooked by application of steam or boiling water. Steam is preferred and is applied at atmospheric pressure or at an elevated pressure of about 10–20 psig. This cooking step is purely conventional and is continued just to the point that the slabs are cooked to their centers. Overcooking to the point of disintegration or the like is best avoided.

In block 3, the cooked slabs of potatoes are fed into a masher where they are subjected to the action of a beater, whip, or similar device to form a mash. The mash is then pressed through a screen whereby to separate the peels. In the event that the original raw potatoes contained defects, the defective areas become hardened in the cooking operation, and are easily separated from the mash together with the peels during the aforesaid screening operation.

Instead of first mashing the cooked potatoes and then screening them, in an alternative procedure the cooked slabs may be directly passed through a screen to form the mash and separate the peels and defects in a single operation.

If desired, nutrients such as proteins and/or vitamins may be incorporated into the potato mash.

It is evident from the foregoing that by applying the cooking step to unpeeled potatoes, one eliminates the usual peeling operations. In our process, pre-peeling is unnecessary because the peels are very easily separated in the mashing operation. Our technique not only results in elimination of the usual operation but also involves a saving of valuable potato flesh. Also, since we remove the peels as such rather than as part of a dilute slurry (as in conventional peeling), the disposal problem is greatly simplified. The peels removed by our technique, being in a concentrated form, can be disposed by burning, or dumping into trenches and covering with soil. Alternatively, they can be used for animal feeding.

Referring again to FIG. 1, the mash is directed to extruder 4 of conventional design where the mash is formed into pieces of a desired shape. In preparing French fries as the final product, the mash is formed into a long strip having a cross-section of about ¼ × ¼ inch or ⅜ × ⅜ inch. The strip is then cut transversely into pieces about 3 to 4 inches long. It is obvious that the shape selected may be varied. Thus, one may compress the mash into such forms as chips, strings, ribbons, sticks, cubes, etc., as desired. Usually, it is preferred that the smallest dimension of the pieces be at least ⅛ inch, preferably at least 3/16 inch.

Although extrusion through a die is a preferred method for shaping the mash, it is obvious that other techniques can be used such as pressing the mash into a mold. Whether extrusion or other shaping technique is used, it is only necessary to apply enough compressive force to yield a piece which is self-sustaining so that it retains its integrity during handling.

The shaped pieces of potato mash are next directed to block 5 where they are treated to form a thin crust or case-hardened layer on their surfaces. For this operation one may use a conventional dehydrator, for example, one which provides an endless belt of non-stick (e.g., Teflon-coated) mesh construction to convey the pieces through a chamber wherein they are exposed to a current of hot air, preferably at about 200° to 300° F.

One technique for producing the desired crust is to expose the pieces to the hot air stream until there is formed on the exterior of the pieces a crust or case-hardened layer of tissue. The time required to establish this effect will vary depending on such factors as the variety and solids content of the potato, the temperature of the air, and the efficiency of contact of the air with the pieces. In any particular case, the proper duration of the treatment can be judged by noting the appearance of the pieces. In many instances the crust will be properly formed when the pieces are reduced in weight about 20 to 40%, preferably 30 to 35% (through evaporation of water).

Since the aim of the treatment in block 5 is primarily to affect the exterior of the potato pieces, it is desirable that all surfaces of the pieces be exposed to the current of hot air. Such conditions can be established in various ways, for example, by supporting the pieces on trays or the like of non-stick (e.g., Teflon-coated) woven wire or perforated metal and/or by providing a mechanical device, such as a slowly rotating brush, to gently turn the pieces as they are exposed to the hot air stream.

In a particularly preferred embodiment of the invention, the pieces are contacted with steam for a brief period after the hot air treatment has been initiated but before it is completed. This procedure has the advantage that the final fried products exhibit a particularly desirable crisp exterior, completely free from any toughness or leatheriness. Typically, this embodiment of the invention utilizes the following procedure:

The pieces are first exposed to the current of hot air for a brief period of time, that is, until a thin papery shell of dried tissue forms on the surface. Generally, this will take only about 1 to 5 minutes, depending on the temperature of the hot air stream. The pieces are then, while still hot, contacted with steam for about 15–60 seconds, or, alternatively, contacted with a fine spray of water applied long enough to wet the surfaces of the pieces thoroughly. Then the pieces are again contacted with the current of hot air. Generally, this second exposure to hot air is continued until the weight loss of the pieces (including that which took place in the first hot air treatment) is about 30 to 35%.

We have observed that the case-hardening treatment—whether conducted solely with hot air or in conjunction with steam—does not cause any significant expansion or puffing of the pieces. They retain essentially the same shape and volume that they had previously.

Figure 2:
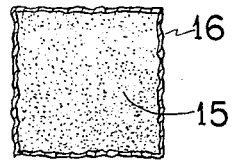
FIG. 2 is a transverse section, on an enlarged scale, of an intermediate in accordance with the invention. For the purpose of illustration, the thickness of the case-hardened layer has been exaggerated.

Reference is now made to FIG. 2, which is a transverse cross-section of our intermediate product on an enlarged scale. Numeral 15 designates the compressed body of cooked potato mash, and numeral 16 designates the thin shell of case-hardened potato tissue which envelopes body 15. In general, shell 16 will have a thickness on the order of about 0.01 to about 0.04 inch. The two components are readily identifiable by appearance; body 15 has the typical mealy texture and appearance of potato mash. Shell 16 is denser, smoother in texture, somewhat glazed, and has a slightly yellowish tinge due to its higher concentration of solids.

Directing attention again to FIG. 1: After the case-hardening operation in block 5, the pieces may be treated in various ways. The alternative paths are designated by lines 6, 7, and 8. The pieces from block 5 need not all follow one of these paths; some may go to one, some to another, etc.

Turning attention first to the path designated by line 6: In block 9 the case-hardened pieces are frozen in conventional manner—for example, in an air-blast freezer—and maintained in frozen storage until they are to be prepared for the table. The products can be held in frozen storage indefinitely without deterioration. An important factor is that the freezing does not cause the individual pieces to stick together; the pieces remain separate even where they are in close contact. This is a very useful attribute of the products—it permits the user to readily remove any desired portion from a package of the frozen pieces. It is further to be noted that the pieces retain their integrity during freezing and thawing; they do not crumble or break apart but are able to resist the usual stresses encountered in packaging, shipping, and other handling operations. Moreover, the products do not discolor; no sulphite or other preservative is needed.

When the frozen products are to be used they are fried in edible oil 365°–375° F. The frozen products can be entered directly into the hot oil and finish-fried in only about 60 seconds, or they may be first thawed and then finish-fried in about 45 seconds. In either case, these rapid finish-fry times are of great advantage to the restaurant operator and are much less than the times used in finish-frying of conventional French fries. Moreover, these short frying times made possible by the invention are the reason why we are enabled to achieve final products of suitable color even though starting from potatoes which have been taken directly from cold storage and which are high in reducing sugars.

The fried products produced as described above meet and even excel the standards of good-quality fried products prepared in conventional manner from fresh potatoes. Thus, our products have a proper golden-brown color, a crisp exterior and a mealy interior, and excellent taste. In these respects, they are equal to high-quality conventional French fries. Moreover, they are superior to the conventional product in that they do not become limp with standing following the frying operation.

Directing attention now to the path designated by line 7: In block 10 the case-hardened pieces are chilled to cold storage temperature (about 35°–45° F.) and kept at such temperature until they are to be prepared for the table. This form of treatment is particularly suitable for sale to institutions, restaurants, hotels, and the like. The products can be kept in an ordinary refrigerator until orders are received by the kitchen, at which time the cook will remove a suitable quantity and fry them in hot oil in conventional manner.

Storage studies conducted by us have shown that the case-hardened products can be kept in cold storage for 10 to 14 days with no deterioration whatsoever. Moreover, no sulphite or other preservative is needed to preserve their color. Samples of our products with no sulphite added have been held nearly a month with no discoloration, but become contaminated with fungal organisms after about 14 days.

Those knowledgeable in the industry are well aware of the practice of cutting peeled potatoes into strips, chilling them, and distributing the product to restaurants and the like as a stock for making French fries. In making these products an essential step is incorporation of sulphite (sodium bisulphite, sulphurous acid, or $SO_2$) into the pieces so that they will not discolor while held in cold storage. In contrast, the products of the invention do not need such preservatives and thus yield a final product of better taste—one completely free from the undesired taste of sulphites.

Another important factor is that the chilling does not cause the individual pieces to stick together; the pieces remain separate even where they are in close contact. This is a very useful attribute of the products—it permits the user to readily remove any desired portion from a package of the refrigerated pieces. It is further to be noted that the pieces retain their integrity; they do not crumble or break apart but are able to withstand the usual stresses encountered in packaging, shipping, and other handling operations.

The fried products prepared from the cold-stored, case-hardened pieces have a proper golden-brown color, a crisp exterior, a mealy interior, and excellent taste. In these respects they are equal to high-quality conventional French fries prepared from fresh potatoes. Moreover, they are superior to the conventional product in that they do not become limp with standing following the frying operation.

Turning attention now to the path designated by line 8: In block 11 the case-hardened pieces are fried in hot oil for 30–60 seconds at about 365°–375° F. The fried products are available for consumption at that time. If they are to be preserved for future use, they are directed to block 12 where they are frozen in conventional manner—for example, in an air-blast freezer, and held in frozen storage until needed for ultimate use.

The products can be held in frozen storage indefinitely without deterioration. An important factor is that the freezing does not cause the individual pieces to adhere together; the pieces remain separate even where they are in close contact. This is a very useful attribute of the products—it permits the user to readily remove any desired portion from a package of the frozen pieces. It is further to be noted that the pieces retain their integrity; they do not crumble or break apart but are able to withstand the usual stresses encountered in packaging, shipping, and other handling operations. Moreover, the products do not discolor; no sulphite or other preservative is necessary.

To prepare the frozen products for the table, they are heated in an oven—for example, at about 450° F. for 10–12 minutes. The resulting fried products have a proper golden-brown color, a crisp exterior, mealy interior, and excellent taste. In these respects, they are equal to high-quality conventional French fries prepared from fresh potatoes. Moreover, they are superior to the conventional product in that they do not become limp with standing following their preparation for the table.

EXAMPLES

The invention is further demonstrated by the following illustrative examples.

Certain tests referred to in the examples were carried out as described below.

Color test: Color was gauged by comparison with a set of color standards used in the industry: USDA Color Standards for Frozen French Fried Potatoes, No. 64-1, Second Ed., 1966, Munsell Color Co., Inc., Baltimore, Md. The standard colors are numbered 0 to 4, with the higher numbers indicating darker color. Products generally regarded as acceptable in the trade are those which exhibit colors 1 to 2; products of color less than 1 are too light; those of color higher than 2 are too dark.

Deflection test: Equipment was set up comprising a platform and clamping means so that a single potato strip could be held on the edge of the platform with 3.5 inches of its length projecting horizontally out into space. A protractor was arranged so that the angle of deflection (sag) of the strip could be measured. In this test, a small angle of deflection indicates a rigid strip; a large angle indicates one that is limp.

Example 1

The raw material used in these experiments was a lot of Russet Burbank potatoes (solids content 21–23%) which had been held in cold storage (40° F.) for 4 months, and were used without applying any reconditioning treatment. It may be noted that these potatoes if used in conventional manner would produce French fries of undesirably dark color.

A. The potatoes were washed and cut transversely into 1-inch thick slabs.

B. The slabs were cooked in steam at atmospheric pressure for 18 minutes.

C. The cooked slabs were pressed through a screen, forming a mash, the peel fragments and defects being retained on the screen and discarded.

D. The potato mash was extruded through a die to provide long rods of potato mash having a cross-section of ⅝ × ⅝ inch. These rods were then cut transversely into pieces about 4 in. long.

E. The pieces of potato mash were then spread on Teflon-coated mesh trays and treated to case harden them. This involved contacting them for 3 minutes with a current of hot (250° F.) air, then for 30–45 seconds with steam, and finally for 15 minutes with the current of hot (250° F.) air. Weighing of samples before and after case hardening indicated that the pieces had a weight loss of 35%.

F. The case-hardened pieces were then frozen in an air-blast freezer (air temperature, minus 36° C.).

The product was stored for several days under freezing conditions. It was noted that the pieces did not adhere to one another and they did not crumble or break apart.

G. A sample of the frozen product was fried in hot (365°F.) oil for 1.5 minutes. Examination and testing of the fried product demonstrated that they had excellent flavor, a crisp exterior, and a mealy interior. Color of the product was No. 2 by the standard designated above. It was also observed that the product did not become limp. Initially—and even after standing until they had reached room temperature—the strips gave zero deflection when subjected to the test described above. In contrast, French fries prepared in conventional manner from the same lot of tubers when tested after they had cooled to room temperature, gave deflections of 20° to 25°.

Example 2

The potatoes used in these runs were the same as described in Example 1.

The potatoes were subjected to the same procedure as described in Example 1, paragraphs A, B, C, and D.

The pieces of potato mash were spread on Teflon-coated mesh trays and treated to case harden them. This involved subjecting different lots of the pieces to currents of hot air at either 200°F. or 300°F. for varying periods of time (as indicated below).

The case-hardened pieces were frozen in an air-blast freezer (minus 36° C.) and held overnight at minus 10° C. The next day, the frozen pieces were fried in hot oil—365° F. for 1.5 minutes.

The conditions used, and the results obtained are tabulated below.

|  | Run I | Run II | Run III | Run IV |
|---|---|---|---|---|
| Case-hardening treatment |  |  |  |  |
| Air temp., °F. | 200 | 200 | 300 | 300 |
| Time, min. | 20 | 30 | 15 | 20 |
| Weight loss, % | 31 | 36 | 31 | 42 |
| Properties of fried product |  |  |  |  |
| Texture, exterior | Crisp | Crisp | Crisp | Crisp* |
| Texture, interior | Mealy | Mealy | Mealy | Mealy |
| Color, No. | 2 | 2 | 2 | 2 |
| Deflection,* |  |  |  |  |
| Directly after frying | 0 | 0 | 0 | 0 |
| After cooling to room temp. | 0 | 0 | 0 | 0 |
| Total solids, % | 43 | 46 | n.d.** | n.d. |
| Fat/non-fat solids, % | 16 | 16 | n.d. | n.d. |

*The product of Run IV was crisper than the other three products.
**n.d. indicates not determined.

With regard to the data on total solids and the ratio of fat to non-fat solids, the following observations may be made: The data indicate that the products of the invention are more nutritious than conventional French fries in that their total solids is over 40%, in contrast to an average of about 30–35% for most commercial French fries. Moreover, the products have a lower fat content; 16% based on non-fat solids in contrast to 20% for most commercial French fries.

Example 3

This example illustrates preparation of the product of the invention in the form of a large single-service portion.

The potatoes used in this run were the same as described in Example 1.

The potatoes were subjected to the same procedure as described in Example 1, paragraphs A, B, and C.

The potato mash was hand molded into a sausage-shaped loaf having a diameter of about 1½ inches and a length of about 6 inches.

The molded loaf was contacted with hot (250° F.) air for 3 minutes, then with steam for 30 seconds, then with hot (250°F.) air to a weight loss of about 30%. During this procedure a case-hardened crust was formed about the loaf.

The case-hardened loaf was fried in hot (375° F.) oil for 30 seconds, cooled, and then frozen in an air-blast freezer.

To prepare the frozen loaf for the table, it was baked (without previous thawing) in an oven at 450° F. for 12 minutes, yielding an excellent tasting product which resembled a good-quality baked potato; it had a crispy edible exterior and a mealy interior.

Having thus described our invention, we claim:

1. An intermediate useful for the preparation of fried products, said intermediate consisting solely of potato flesh, and comprising a shaped body of compressed cooked potato mash enveloped in a thin shell of case-hardened potato tissue.

2. A fried potato product prepared by frying in hot oil the intermediate of claim 1.

3. An intermediate useful for the preparation of fried products, said intermediate consisting solely of potato flesh, and being a shaped body of compressed, cooked potato mash enveloped in a shell of case-hardened potato tissue having a thickness of 0.01 to 0.04 inch.

* * * * *